United States Patent

Kikinis et al.

[11] Patent Number: 5,919,263
[45] Date of Patent: Jul. 6, 1999

[54] COMPUTER PERIPHERALS LOW-POWER-CONSUMPTION STANDBY SYSTEM

[75] Inventors: Dan Kikinis, Saratoga; Pascal Dornier, Sunnyvale, both of Calif.

[73] Assignee: Elougx I.P. Holdings L.T.D., United Kingdom

[21] Appl. No.: 09/066,098

[22] Filed: Apr. 23, 1998

Related U.S. Application Data

[60] Division of application No. 08/548,662, Oct. 26, 1995, Pat. No. 5,821,924, which is a continuation-in-part of application No. 08/319,256, Oct. 6, 1994, abandoned, which is a continuation of application No. 08/141,413, Oct. 22, 1993, Pat. No. 5,389,952, which is a continuation of application No. 07/984,370, Dec. 2, 1992, abandoned, said application No. 08/548,662, is a continuation-in-part of application No. 08/175,743, Dec. 30, 1993, Pat. No. 5,489,935, which is a continuation of application No. 07/940,688, Sep. 4, 1992, Pat. No. 5,321,428.

[51] Int. Cl.$^6$ .................................................. G06F 13/00
[52] U.S. Cl. ............................................ 713/320; 713/300
[58] Field of Search ........................ 395/750.01–750.08

[56] References Cited

U.S. PATENT DOCUMENTS

| | | | |
|---|---|---|---|
| 3,955,185 | 5/1976 | Nishimura . | |
| 4,716,463 | 12/1987 | Stacy et al. . | |
| 4,811,200 | 3/1989 | Wagner et al. . | |
| 5,335,168 | 8/1994 | Walker | 364/707 |
| 5,384,579 | 1/1995 | Nakasuji et al. . | |
| 5,404,149 | 4/1995 | Joliey . | |
| 5,408,668 | 4/1995 | Tornai | 395/750 |
| 5,486,726 | 1/1996 | Kim et al. | 307/120 |
| 5,489,935 | 2/1996 | Dornier | 347/211 |
| 5,579,524 | 11/1996 | Kikinis | 395/750 |
| 5,586,333 | 12/1996 | Choi et al. | 395/750 |
| 5,594,672 | 1/1997 | Hicks | 364/707 |
| 5,630,144 | 5/1997 | Woog et al. | 395/750 |
| 5,648,799 | 7/1997 | Kikinis | 345/212 |
| 5,736,873 | 4/1998 | Hwang | 327/41 |
| 5,821,924 | 10/1998 | Kikinis et al. | 345/212 |

FOREIGN PATENT DOCUMENTS

| | | |
|---|---|---|
| 90306158 | 11/1991 | European Pat. Off. . |
| 62-190853 | 7/1987 | Japan . |
| 1-124495 | 5/1989 | Japan . |
| 7839892 | 5/1979 | United Kingdom . |

*Primary Examiner*—Ayaz R. Sheikh
*Assistant Examiner*—Jigar Pancholi
*Attorney, Agent, or Firm*—Donald R. Boys

[57] ABSTRACT

A system for reducing power consumption of a computer peripheral device connected to a host computer during periods of inactivity of the host computer has a dedicated input for initiating power management operations. When the dedicated input is sensed a timer is started and a power management command is sent to the peripheral device, initiating a reduced-power mode other than off. In a preferred embodiment the system also starts a timer when the dedicated input is sensed, and after a predetermined time a second power management command is sent triggering a second reduced-power mode for the peripheral. The system is adapted to peripheral devices such as video displays and printers.

14 Claims, 9 Drawing Sheets

COMPUTER PERIPHERALS LOW-POWER-CONSUMPTION STANDBY SYSTEM

CROSS-REFERENCE TO RELATED DOCUMENTS

This application is a Divisional application from U.S. Ser. No. 08/548,662, filed Oct. 26, 1995, now U.S. Pat. No. 5,821,924 which is a Continuation-In-Part (CIP) of application Ser. No. 08/319,256, filed Oct. 6, 1994, abandoned which is a continuation of application Ser. No. 08/141,413, filed Oct. 22, 1993 now U.S. Pat. No. 5,389,952, which is a continuation of Ser. No. 07/984,370 filed Dec. 2, 1992, abandoned. Ser. No. 08/548,662 now U.S. Pat. No. 5,821,924 is also a CIP of application Ser. No. 08/175,743, filed Dec. 30, 1995 now U.S. Pat. No. 5,489,935 which is a continuation of application Ser. No. 07/940,688 filed Sep. 4, 1992, now U.S. Pat. No. 5,321,428. All of these prior documents are incorporated herein by reference.

FIELD OF THE INVENTION

The present invention is in the field of automatic power-saving methods and devices, and pertains in particular to reducing power consumption by computer peripheral devices.

BACKGROUND OF THE INVENTION

Power consumption by computer peripheral devices, such as printers, display monitors, mass storage devices, and the like has become, with the expansion of computer installations, a significant portion of residential and commercial power requirements. For example, a typical color display monitor may consume as much as 50 to 80 percent of the total electrical energy consumed by a personal computer (PC). A display monitor dissipates this energy as visible light emissions from screen phosphors, thermal waste, electromagnetic radiation, high-energy radiation and acoustic energy. Only the phosphor emissions are normally considered useful and then only when actively being watched by an observer. The radiation emissions have been a hotly debated source of concern regarding possible health risks from long-term exposure. Manufacturers incur considerable extra expense to reduce radiation emissions from display monitors. Some people are annoyed by the acoustic emissions produced by some monitors. Thermal losses from display monitors contribute an additional load on air conditioning equipment. The energy efficiency of display monitors has historically improved mostly as a result of advances in the electronic circuit components such as the increased use of integrated circuit (IC) devices. Cathode ray tube (CRT) technology has improved rather little in terms of energy efficiency.

The number of PC's in regular use is growing rapidly and has reached a point where they have become major consumers of electric power. The United States Environmental Protection Agency has issued power efficiency targets for computer manufacturers to design for in new systems. Low-voltage IC's use less energy, and microprocessor power management techniques allow a computer to reduce energy consumption when idling. Until a suitable replacement for the CRT or a more efficient CRT is developed it will be difficult to substantially improve personal computer energy efficiency.

As described above, display monitors are not the only computer peripheral devices which consume large amounts of energy in use. Laser printers are another example. Other peripherals, such as mass storage devices, also consume electrical energy when not in full use, but to a lessed extent than do devices that have electrical heaters. In a typical working environment, printers are left on all the time as a convenience to users and are consequently consuming power in order to keep the fuser-heater at the proper operating temperature and the printer ready to print in response to instructions from a connected computer, i.e. a print request. A print request sent by a computer is received by the printer buffer and scheduled for printing, which typically commences when the buffer contains a full page and a "not busy" message is received from the printer. The fuser-heater is the principal consumer of power in a laser-type printer and typically a fan for dissipating heat from the fuser-heater is the main source of noise. If a printer is allowed to run continually and no printing instructions are received, the fuser-heater will be kept at a certain set temperature, the fan will continue to operate to cool the rest of the printer, and the printer will be in a ready state. If the printer is turned off when not being used, it will require a certain amount of time to bring the fuser-heater up to a proper temperature and begin carrying out instructions from the computer when it is turned on again in response to a print command. The amount of time required for a fuser-heater to reach operating temperature is dependent on several factors that are unique to each printer. The wait that is necessarily involved is awkward and costly in a multi-user environment.

With several computers and one or more printers running in an enclosed area, there may be a heat build-up that must be eliminated through climate control equipment to maintain a successful operation. If the principle heat-producing element in a laser-type printer, the fuser-heater, could be turned off for times of non-use, this problem would be considerably reduced.

What is needed is a way to shut down high-energy-consuming circuits in the display monitor, printers such as laser printers having fuser heaters, and in other peripheral devices, when the computer determines that full power on one or more of the connected peripheral devices isn't needed. This might be determined by a period of inactivity on input devices such a modem, mouse and keyboard, inactivity of peripheral devices, monitoring of a computer's internal bus, and in other ways, such as by a user-initiated input; for example an assigned "hot-key" input. Many computers and display terminals use such a technique to activate a screen blanking circuit or a program that displays moving images (or no image) to avoid burning the screen phosphors. Activating an input device such as pressing a key or moving a mouse causes the previous screen image to be restored. This technique can be extended to reduce peripheral device power consumption by signaling a microcontroller in a peripheral device, such as a monitor or printer, or an add-on device for "dumb" peripherals, to shut down or restore some or all of the device's electrical power circuits. One key to accomplishing this end is a means of signaling a monitor to shut down to some selected level without adding to the signals presently provided to a monitor.

SUMMARY OF THE INVENTION

In a computer system having a host computer with a central processing unit (CPU), a memory, and input apparatus, and having also a connected peripheral device, a power management system for managing power usage by the peripheral device, the power management system comprising a user input dedicated to triggering a power-management routine; a signal generator for generating at least one power-management command for the peripheral device; and a power manager circuit in the peripheral device. In this system activation of the dedicated user input causes the signal generator to send a power management command to the peripheral device, and the power manager circuit in the peripheral device causes the peripheral device to assume a reduced-power state other than off in response to the power management command.

The system is applicable to peripheral devices of many sorts, such as video displays and laser printer devices. Where the peripheral device is a video display provided with VGA-standard signals, the power management command may be coded in the VGA-standard signals sent to the video display. In some embodiments the input apparatus includes a keyboard, and the user input dedicated to triggering a power-management routine is a key combination to he entered at the keyboard.

In some embodiments the power management system further comprises a timer adapted to measure periods of inactivity of the computer system, wherein activation of the dedicated user input signals the signal generator to send a first power management command to the peripheral device, to initiate the timer, and to send a second power management command to the peripheral device at a preset time as measured by the timer after the first power management command, and the power manager circuit in the peripheral device causes the peripheral device to assume a first reduced-power state in response to the first power management command and a second reduced power state in response to the second power management command. In the special case of a video monitor receiving VGA-standard signals, the power management commands are preferably coded in the VGA-standard signals.

In another aspect of the present invention a computer is provided, comprising a central processing unit (CPU); a memory connected to the CPU for storing data and instruction routines; input apparatus coupled to the CPU for a user to provide input to the computer; a user input dedicated to triggering a power-management routine; and a signal generator adapted for sending at least one power management command to a port adapted for communication with a peripheral device. In this embodiment activation of the dedicated user input causes the signal generator to send a power management command to the port adapted to communicate with a peripheral device.

In this aspect of the invention the port adapted for communication with a peripheral device may be one of a printer port and a video display port. In the case of a video display port adapted to send VGA-standard signals the power management command may be coded in the VGA-standard signals to be sent to the video display. Also in this aspect the input apparatus may include a keyboard and the user input dedicated to triggering a power-management routine may be a key combination to he entered at the keyboard. There may also further be a timer adapted to measure periods of inactivity at the computer, wherein activation of the dedicated user input signals the signal generator to send a first power management command to the peripheral device port, to initiate the timer, and to send a second power management command to the peripheral device port at a preset time as measured by the timer after the first power management command. Again, where the peripheral device port is a port adapted to send VGA-standard signals to a video monitor, the first and second power management commands may be coded in the VGA-standard signals.

In yet another aspect a method for saving power in operation of a peripheral device of a computer system wherein a host computer sends signals to communicate with the peripheral device is provided, comprising steps of (a) sensing operation of an input dedicated to initiate power management; (b) sending a power-management command to the peripheral device in response to operation of the dedicated input; (c) detecting the power-management command at the peripheral device; (d) signaling power-management circuitry in the peripheral device from the detection circuitry that a power-management command is received; and (e) reducing power to power-using circuitry in the peripheral device to a level other than off by the power-management circuitry in response to the signal from the detection circuitry. In this aspect, in step (b), a timer may be started and a first power management command is sent as a result of sensing operation of the dedicated input, and a second power management command is sent after a predetermined time period measured by the timer. Alternative reduced-power states are provided according to the first and second power management signals.

In still another aspect, in a computer having circuitry providing signals to a peripheral device, a method for commanding the peripheral device to assume alternative power-using states is provided, comprising steps of (a) sensing operation of an input dedicated to initiating power management; (b) starting a timer and sending a first power management command coded in the signals to the peripheral device as a result of sensing the operation of the dedicated input; and (c) sending a second power management command coded in the signals to the peripheral device after a predetermined time period as measured by the timer.

In the various aspects of the invention, all described in enabling detail below, power management of peripheral devices, such as video monitors and printer devices, especially those printers using fuser-heaters requiring significant power, is provided in a manner not before available in the art.

DESCRIPTION OF THE PREFERRED EMBODIMENTS

Figure 1:
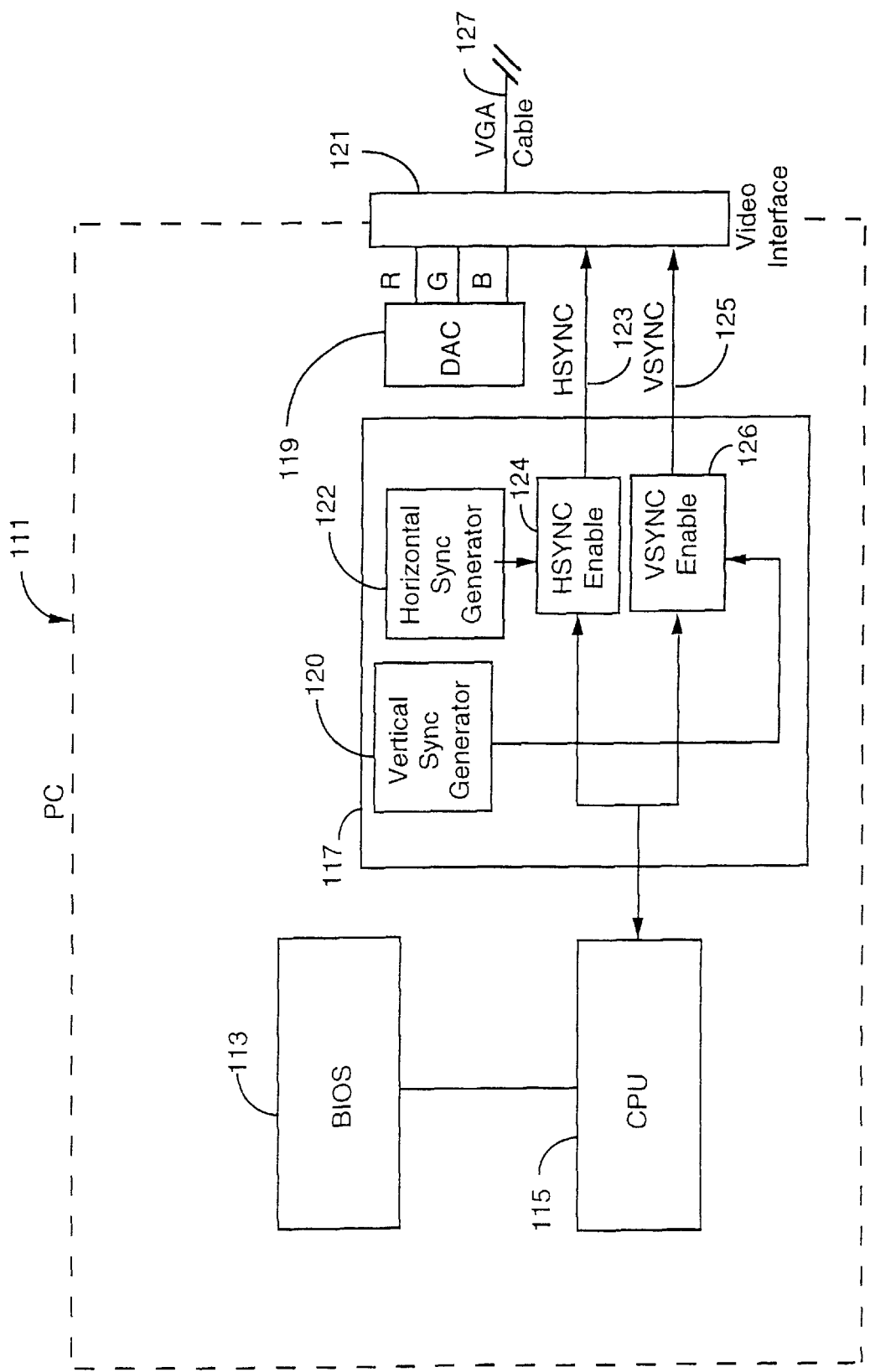
FIG. 1 is a largely schematic representation of a PC according to an embodiment of the present invention.

FIG. 1 shows the functional elements of a preferred embodiment of the present invention capable of providing 3 distinct signals to a monitor to signal the monitor to adjust to as many as three states. In an embodiment of the invention, the states are selected levels of monitor power management (MPM). The signal to the monitor is based on interrupting one or the other or both HSYNC and VSYNC signals. In the embodiment shown in FIG. 1 a PC 111 comprises a Basic Input Output System (BIOS) 113 and a Video Graphics Adapter (VGA) 117. The invention will work equally well with other video adapters, as virtually all such adapters employ HSYNC and VSYNC signals. In some other adapters, equivalent means of interrupting the HSYNC and VSYNC signals would be used.

BIOS 113 includes instructions for MPM, which can cause a central processing unit (CPU) 115 to change the state of sync-enable controls in VGA 117. In alternative embodiments instructions for implementing MPM might be embedded in operating system (OS) device driver routines or Terminate and Stay Resident (TSR) programs.

The MPM instructions monitor CPU 115 interrupts for input devices (not shown) such as the timer, keyboard and serial communication ports. MPM instructions advance a time-out counter on each timer interrupt and reset the count to an initial value on each monitored interrupt. The initial value of the MPM time-out counter may be fixed or adjustable. When the MPM time-out counter reaches a pre-set overflow value, due to cessation of monitored interrupts, instructions are executed that change the state of HSYNC Enable 124 and VSYNC Enable 126 control to disable output of horizontal synchronization signals (HSYNC) 123, produced by horizontal sync generator 122, and/or vertical synchronization signals (VSYNC) 125, produced by vertical sync generator 120, or both. A subsequent monitored interrupt causes execution of instructions that change the state of HSYNC Enable 124 and VSYNC Enable 126 control circuits to enable output of HSYNC 123 and VSYNC 125 signals from VGA 117.

In the case of a VGA controller, the enable/disable capability is through writing by the CPU into register 3C2 of the controller, wherein bits six and 7 are reserved for horizontal retrace polarity and vertical retrace polarity respectfully. HSYNC and VSYNC signals 123 and 125 are brought to interface 121 along with other signals, such as R, G, and B signals from D/A/converter 119. The signals are transmitted to a monitor on VGA cable 127 as is known in the art. The pin-out for the signals on a VGA cable is well-known, and is shown in IBM Personal System/2, Model 80 Technical Reference, published by IBM in 1987.

Figure 2A:
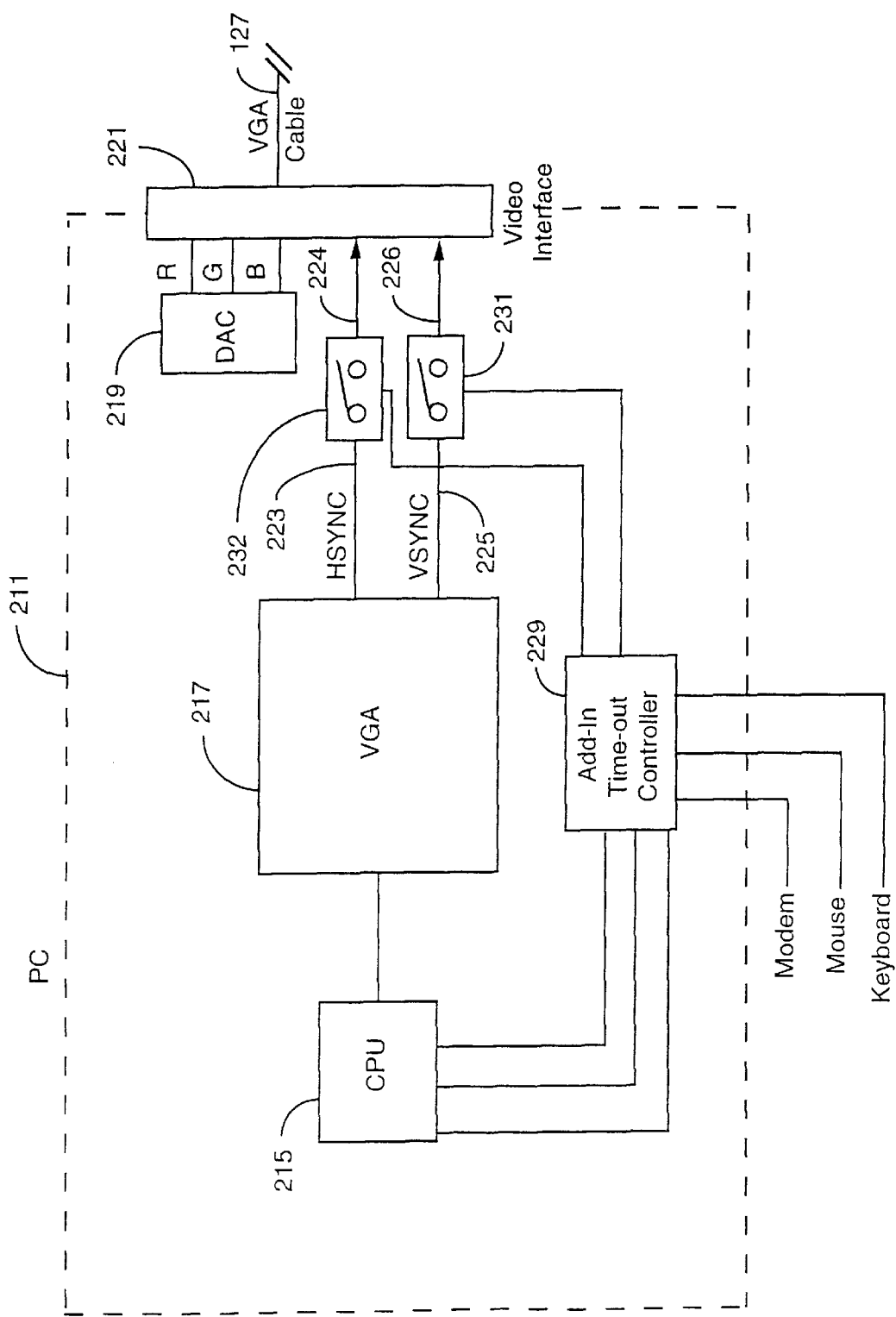
FIG. 2A is a largely schematic representation of a PC enhanced by an add-on device according to an alternative embodiment of the present invention.

In an alternative embodiment, shown in FIG. 2A, useful for refitting existing computers, a current art PC 211 having a CPU 215 is enhanced by installation of a switch 231, which connects between a VGA 217 VSYNC output 225 and VSYNC input 226 to a video interface 221. In a color computer, R,G, and B signals are brought to interface 221 from DAC 219. An add-in time-out controller 229 comprising MPM instructions monitors input device activity as described above for FIG. 1. Time-out of all input devices causes instructions to be executed which change the state of program-controlled switch 231, blocking VSYNC input 225 to video interface 221. Resumption of monitored interrupts causes switch 231 to close, returning the VSYNC signals to line 226. A second switch 232 may be used in the HSYNC line to interrupt the HSYNC signals to line 224, and, in this embodiment, the add-in time-out controller controls both switches. In yet another alternative, one switch may be used to interrupt both HSYNC and VSYNC signals.

The functional blocks presented in FIG. 2A are an internal solution to an add-in hardware/software embodiment, and the blocks are not intended to be taken literally as hardware devices and interfaces. It will be apparent to one with skill in the art that there are many equivalent ways the functional blocks might be accomplished. The keyboard, mouse, and modem inputs are monitored by the add-in controller, and are made available as well to the CPU in the typical manner.

Figure 2B:
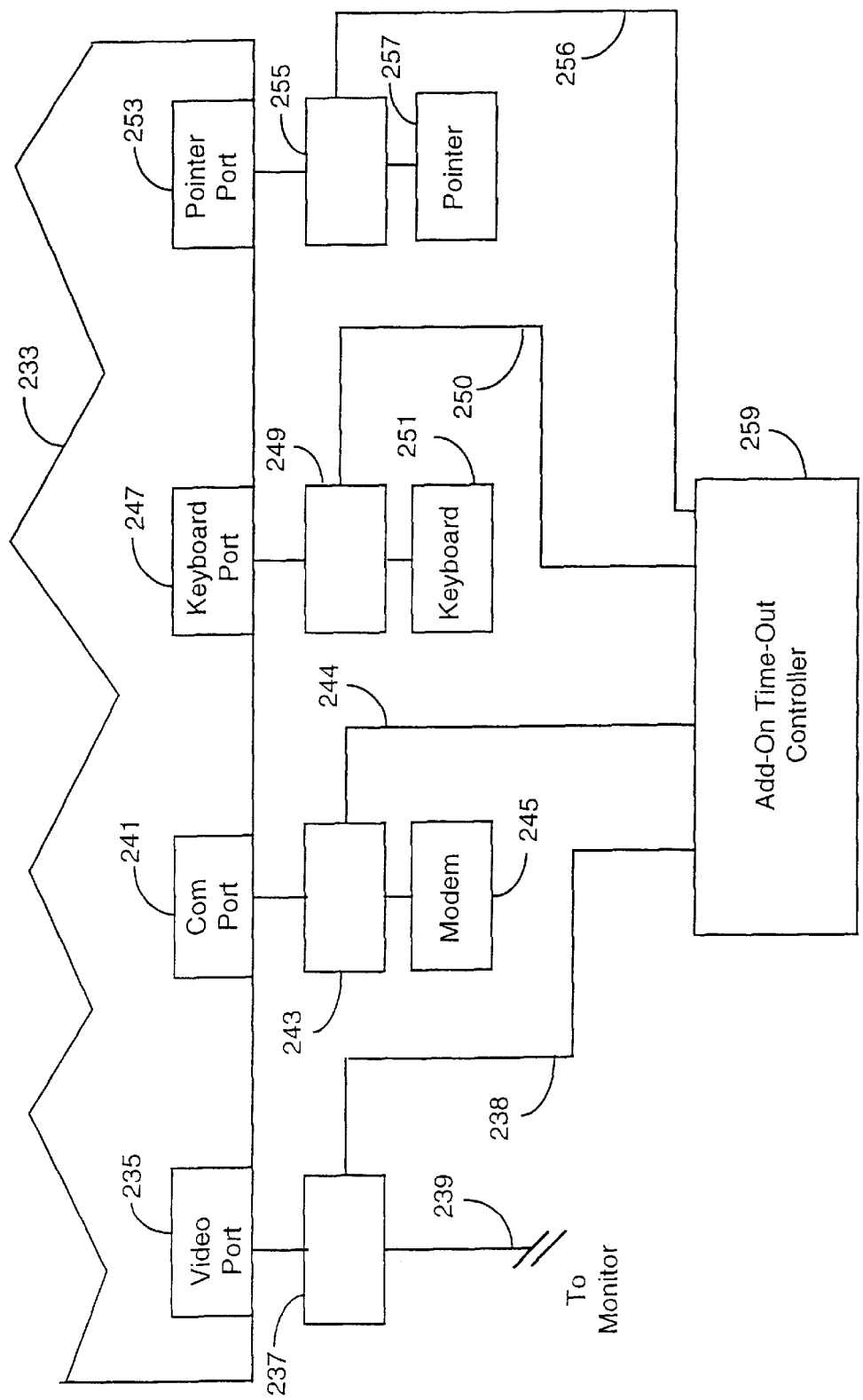
FIG. 2B is a largely schematic representation of a PC enhanced by an add-in device according to another alternative embodiment.

FIG. 2B shows an external solution for a hardware/software embodiment. In this solution an add-on time-out controller 259 is external to computer system 233, and each port that supports an input device and the video output port is fitted with an interface device connected to the add-on time-out controller. For example, interface 243 at COM port 241 used for a modem 245 monitors modem activity and reports to controller 259 on line 244. Interface 249 at keyboard port 247 monitors keyboard 251 activity and reports to controller 259 on line 250. Interface 255 at pointer port 253 monitors pointer 257 activity (mouse, joystick, trackball), and reports to controller 259 on line 256.

In this embodiment controller 259 accomplishes the timer functions and outputs signals on line 238 to interface device 237 at video port 235. Line 239 goes to the monitor. Device 237 interrupts HSYNC and VSYNC signals according to the overflow states of add-on controller 259.

Figure 3:
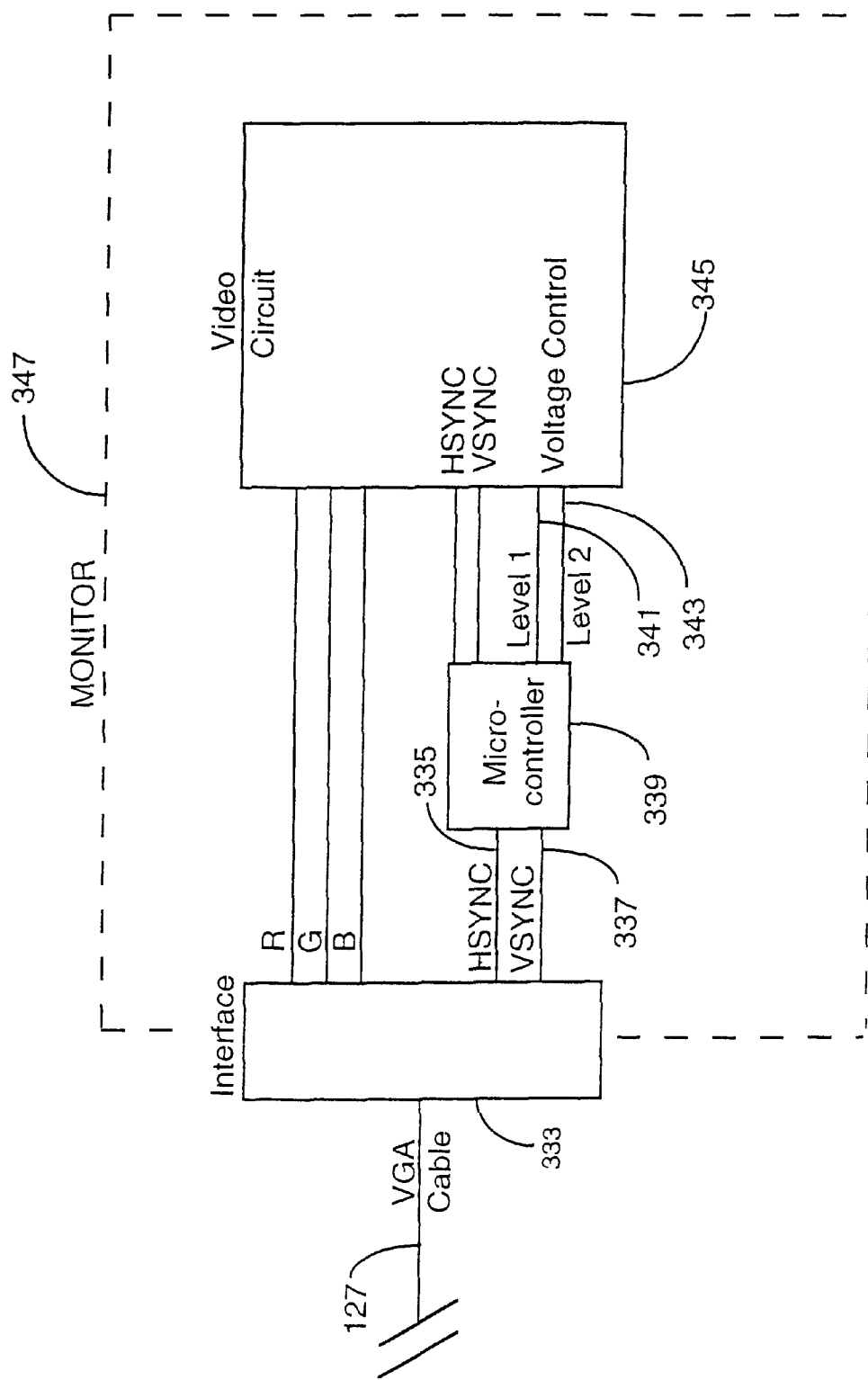
FIG. 3 is a largely schematic representation of a microcontroller-based video monitor according to an embodiment of the present invention.

A color video monitor 347 according to an embodiment of the present invention is shown in FIG. 3. Monitor 347 comprises an interface 333, a microcontroller 339 having MPM instructions according to the present invention and a video circuit (VC) 345 having voltage control circuitry. From interface 333 HSYNC pulses 335 and VSYNC pulses 337 go to microcontroller 339. Microcontroller 339 monitors the HSYNC signal 335 and VSYNC signal 337. The MPM instructions described above count the number of HSYNC pulses occurring between each pair of VSYNC pulses. Zero HSYNC pulses counted causes the MPM instructions in microcontroller 339 to change the voltage on Level-2 signal line 343. Similarly, an interval count of HSYNC 335 pulses greatly in excess of the maximum video scan rate for monitor 347, indicating a loss of VSYNC 337, causes microcontroller 339 to change the voltage on Level-1 signal line 341. Resumption of HSYNC 335 to VSYNC 337 pulse interval counts to a range from the minimum to the maximum scan rate causes MPM instructions in microcontroller 339 to restore quiescent voltage levels to Level-1 signal line 341 and Level-2 signal line 343.

When video circuit 345 senses an active voltage level on Level-1 signal line 341, it cuts off power to all circuits in monitor 347 except microcontroller 339, any power necessary to interface 333, and video circuit 345 power-control circuits (not shown). In this level 1 standby mode, power consumption of monitor 347 is reduced by more than 90 percent. If monitor 347 remains in level 1 standby for more than a few seconds, full warm-up time is required to reactivate it. An active voltage level on Level-2 signal line 343 causes video circuit 345 to cut off power to all circuits except those described above plus the CRT cathode heater. In level 2 standby mode monitor 347 power consumption is reduced by 80 to 90 percent. Because the CRT is kept hot, reactivating monitor 347 from level 2 standby requires about 5 seconds or less. Reactivation of monitor 347 occurs when voltage on Level-1 signal line 341 and Level-2 signal line 343 returns to the quiescent state allowing video circuit 345 to activate power to all circuits of monitor 347.

Figure 4:
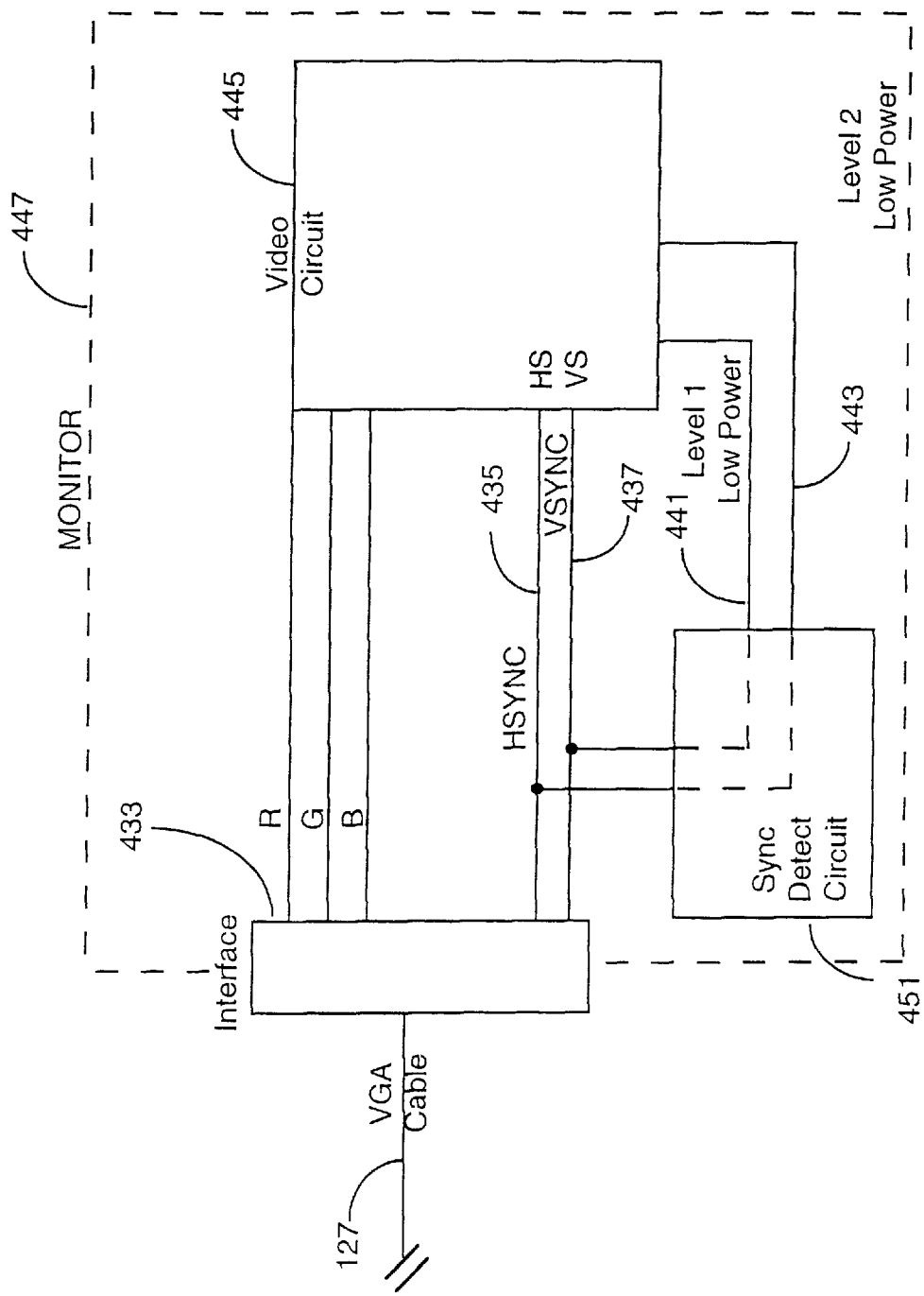
FIG. 4 is a largely schematic representation of a "dumb" monitor equipped with an add-in device according to an alternative embodiment of the present invention.

FIG. 4 shows an alternative embodiment of the present invention in a monitor 447 with video circuits functionally similar to those described for the monitor shown in FIG. 3, including an interface 433 and a video circuit 445, but without a microcontroller. A sync detect circuit 451 compares pulse intervals for HSYNC 435 and VSYNC 437 against time-constants of adequate duration to allow for brief interruptions of sync pulses. Loss of HSYNC 435 pulses or VSYNC 437 pulses for periods longer than the associated time-constants causes sync detector circuit 451 to change Level-1 signal line 441 or Level-2 signal line 443 voltage to its active state as described for FIG. 3 and with the same results. Similarly, resumption of HSYNC 435 and VSYNC 437 pulses reactivates monitor 447 as described for FIG. 3 above.

Figure 5:
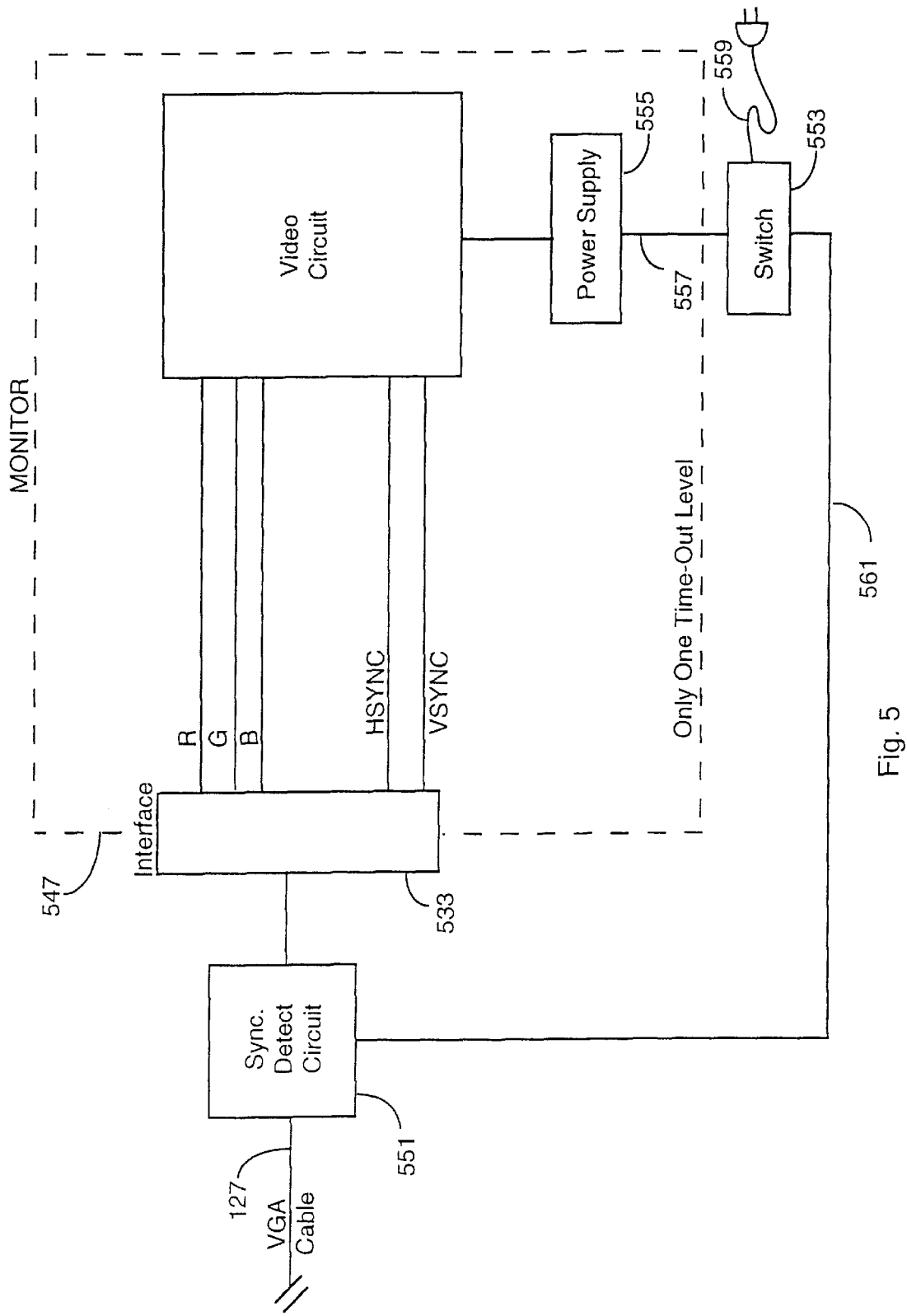
FIG. 5 is a largely schematic representation of an add-on device for controlling AC primary power to a monitor according to another alternative embodiment of the present invention.

FIG. 5 shows another alternative embodiment of the present invention suitable for add-on use with a monitor 547 having an interface 533. A sync detect circuit 551, in an external enclosure having pass-through connections, inserts into VGA cable 127. Sync detect circuit 551 monitors video signals on VGA cable 127 and compares the SYNC interval for one or the other of VSYNC and HSYNC to a time-constant in a manner similar to that described for FIG. 4 above. Loss of the monitored SYNC signal in VGA cable 127 for an interval longer than the time-constant causes sync detect circuit 551 to change the voltage on power-control line 561 to its active level, which in turn causes an electronically-controlled switch 553 to open. Electronically-controlled switch 553 controls AC primary power from an electrical cord 559 to a receptacle for monitor 547 power supply cord 557. When electronically-controlled switch 553 opens, AC power to a DC power supply 555 is lost, thus causing total shutdown of monitor 547. Resumption of SYNC signals in VGA cable 127 video signal causes sync detect circuit 551 to change power-control line 561 to its quiescent state, thus causing electronically-controlled switch 553 to close, which restores AC power input to DC power supply 555 reactivating monitor 547.

It will be apparent to one with skill in the art that there are many changes that might be made in the embodiments describing power-management of display monitors and the like without departing from the spirit and scope of the invention. Some of these alternatives have already been described, such as MPM instructions implemented in an OS device driver or TSR routines instead of the BIOS, single-level MPM instead of two-level MPM and an external video monitor power control device. Other methods of signalling MPM state changes to a monitor might include time-based coded sequences of frequency changes in HSYNC or VSYNC, coded values in the color signals, or no color signal for an extended period. Alternative embodiments of MPM routines might allow an operator to control MPM operation through command steps, such as menus, dialog boxes or command lines. Such controls might include shutting down monitor power at will by pressing a "hot key", typing a command line or other program interface step. Other features might allow the operator to change the idle time required to trigger MPM and toggle MPM monitoring on or off. Alternative MPM routines might also require an operator to type a password before enabling the transmission of normal video signals to the video monitor. Alternative devices for both built-in and post-manufacture modification to implement monitor power control might be devised. Embodiments of the present invention for monochromatic and grey-scale video adapters and monitors are also contemplated.

As described above, display monitors are not the only computer peripheral devices which consume large amounts of energy while is a resting condition. Laser printers, and other printers that use fusing processing requiring heat are another example.

Figure 6:
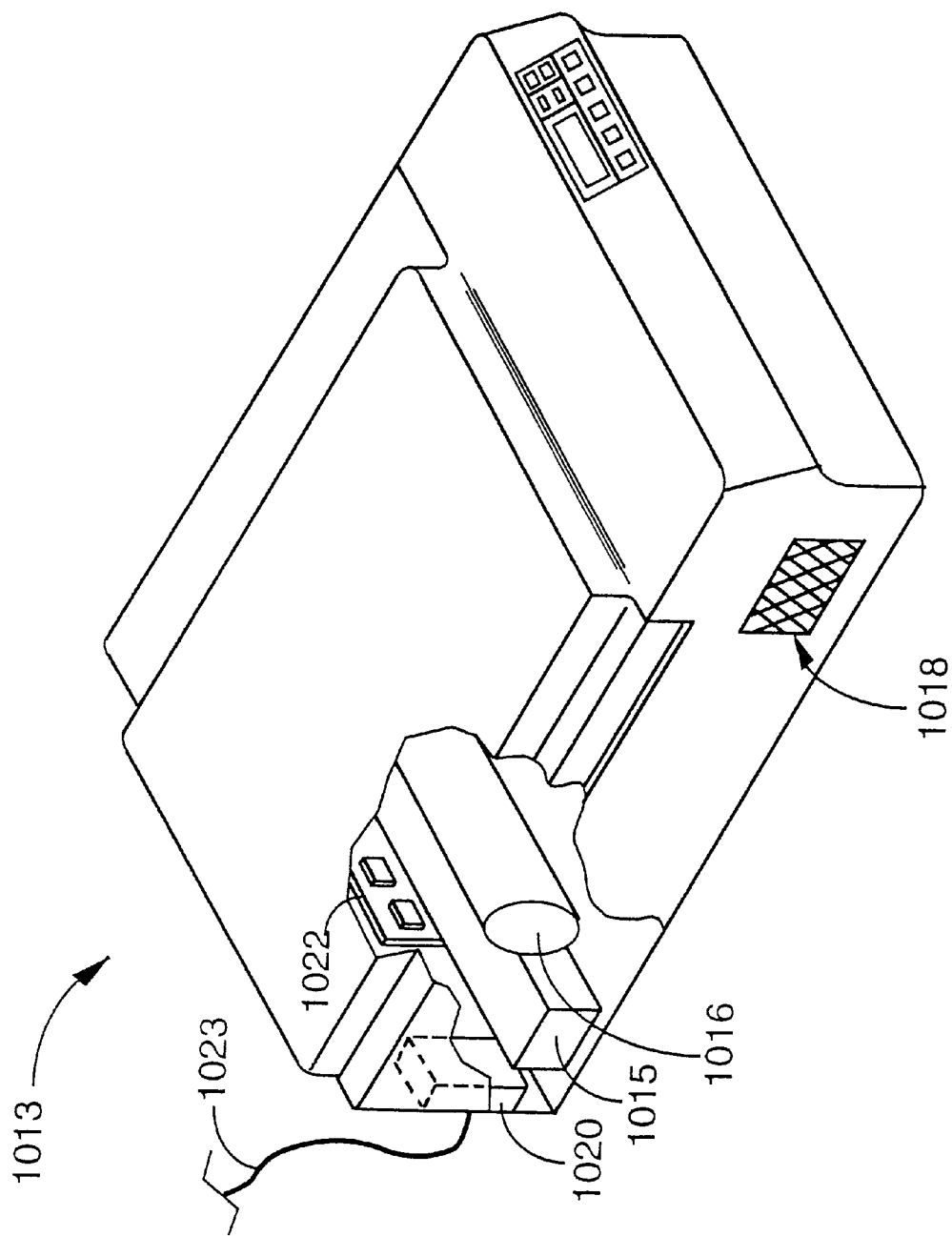
FIG. 6 is a view of a laser-type printer as used with the present invention.

FIG. 6 is an isometric drawing of a laser-type printer 1013 operable according to the present invention, and which contains a fuser-heater 1015, a drum 1016, a fan 1018, a buffer 1020, a controller 1022, and a cable connection 1023 that joins the printer to a host computer or a to a network. Fuser-heater 1015 is responsible for heating the toner applied to drum 1016 after an image has been written to the drum to fuse the toner to the paper. Instructions sent by a computer what is written, and the entire process is managed by control routines. Fan 1018 (if used) in the printer is powered on at start up and is usually controlled by a heat-sensing mechanism that reacts to internal temperature and runs in reaction to cool mechanical and electronic elements of the printer. The majority of printers have a memory buffer that electronically stores composed pages transmitted by the control routines and sends the data to the processing unit of the printer as the printer is ready to accept it. When the buffer has emptied its contents to the printer and all instructions from the computer have been carried out, the printer waits for further input and maintains all of its components in a state of readiness. Actual operation can vary from printer to printer according to the type and speed of the printer and the size of the printer buffer.

It is not the intent of the present description to present a detailed description of laser-type printing, but rather to present an example of a relatively common printing function and demonstrate its functional components in the context of the present invention.

Figure 7:
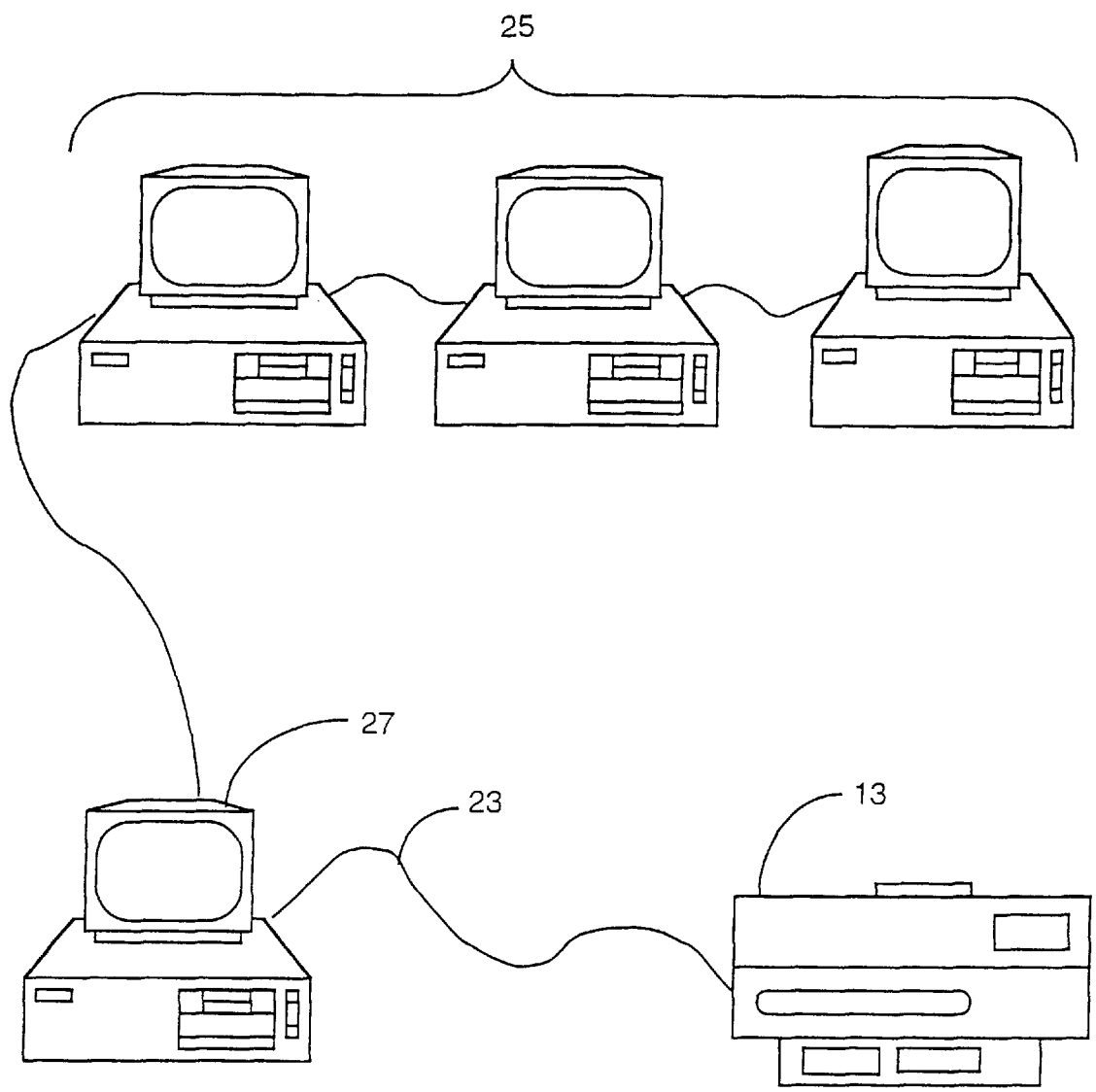
FIG. 7 is a drawing of a laser-type printer operated according to the present invention on a network with several computers.

The embodiment of the present invention as shown in FIG. 7 demonstrates laser-type printer 1013 operating within a networked environment of other computers 1025 and possibly other printers and with a network server computer 1027. The present invention provides a means to keep the printer operating and prepared to print but to save power by turning off the fuser-heater portion of the laser-type printer. In response to a reduction in heat created by turning off the fuser-heater, the fan will shut down and run only infrequently, if at all, in response to ambient heat from other sources.

The connection to a computer or computers is never broken. The turning off of the fuser-heater significantly lessens power consumption and heat dissipation requirements.

Control routines that are a part of the invention can be installed on any computer that uses a printer that uses a fuser-heater or can be installed solely on network server, such as server 1027 in FIG. 7, or may be installed preferably in the printer. The system of the invention comprises a means of turning off fuser-heater 1015 (FIG. 6) in laser-type printer 1013 after a set amount of time has passed without any input from the network server or from the connected computer or computers, and to turn it back on again when the connection is initialized (such as when a computer on the network is turned on) or a print request is sent from an attached network server or single computer. The printer stays on all the time, and only the fuser-heater element is turned off.

When the fuser-heater is turned back on after being powered down, it requires a certain amount of time to reach the correct operating temperature. During this time, the printer buffer is fully active and still accepts input but does so more slowly than usual until the fuser-heater is at operating temperature. This slower data acceptance rate avoids software timeouts, such as might occur when printing from DOS. A user will seldom notice slower operation and will not be aware that an element in the printer has been turned off or conversely, turned back on again. The system performs this function automatically. In a preferred mode of operation the reduced data acceptance rate is set to be equal to or smaller than the buffer size divided by the warm-up time. In some embodiments the control routines can further be manipulated to manually turn the fuser-heater on or off at any time.

Figure 8:
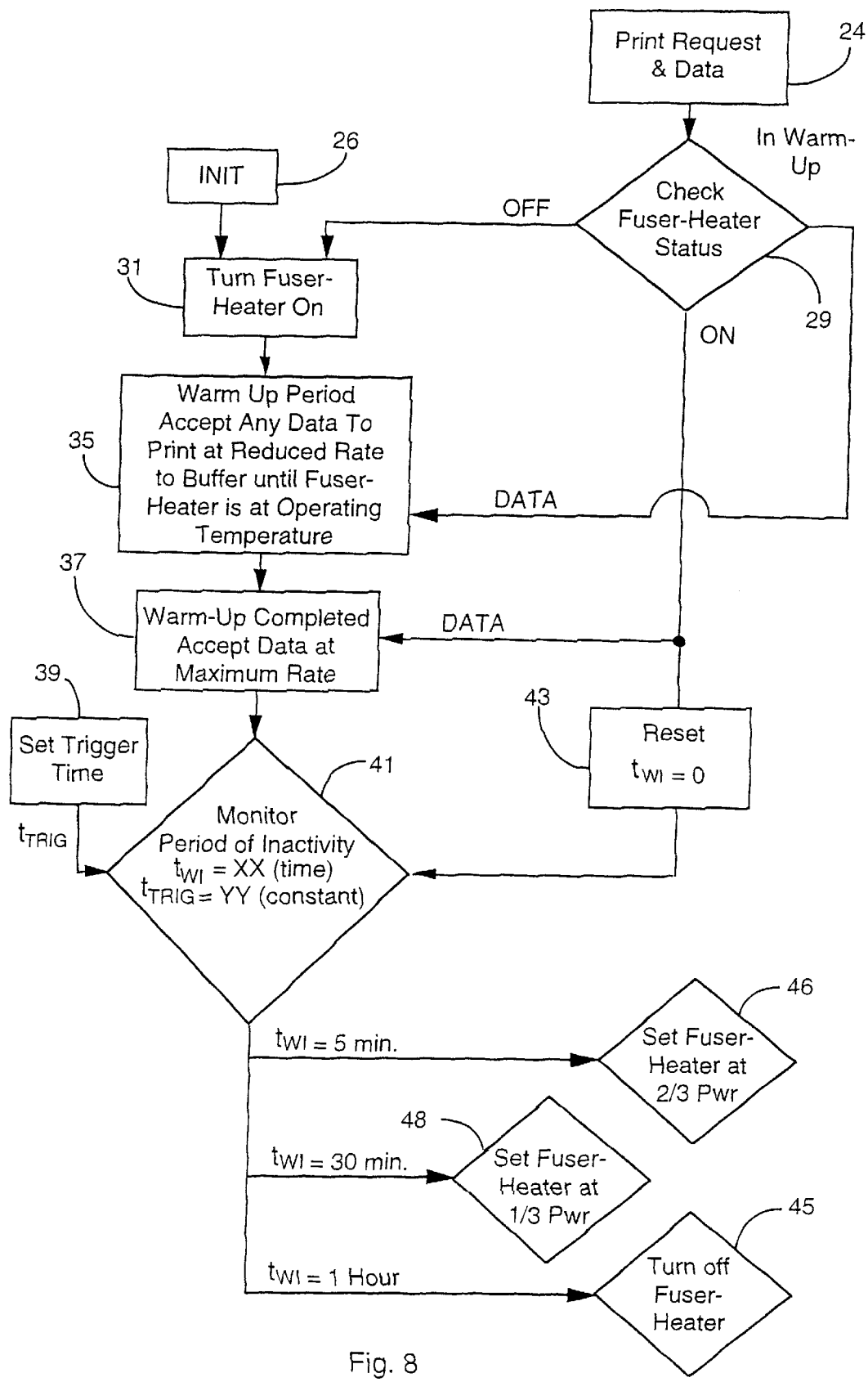
FIG. 8 is a flow chart of the printing process according to the present invention.

FIG. 8 is a flow diagram illustrating the operation of the present invention to control laser-type printer functions and thereby save power and decrease noise.

An INIT signal (point 1026) is received from a host system when the system starts up, such as after an intentional downtime. INIT turns on fuser-heater 1015 at point 1031 as a consequence of turning on the printer itself. The INIT signal or similar signal is also received when a laser-type printer is turned on directly. After start-up, the system responds to print requests from the server 1027 or any one of the computers 1025 on the network (FIG. 7). The system receives a print request at point 1024 and determines whether the fuser-heater is on, off, or in a warm-up mode (point 1029).

If the fuser-heater is on and at operating temperature when a print request is received, data is accepted by the buffer at maximum rate (1037). The rate for a particular printer buffer is unique to each laser-type printer.

The printer fuser-heater is managed by monitoring the time between print requests (1041). This time is designated $t_{WI}$, for time without input, and is measured by a timer in the control circuitry. The timer is reset to zero (1043) each time a print request is received and the printer is determined to be initialized and at operating temperature. A trigger time, $T_{TRIG}$, is set (1039) for a maximum period between print requests, and the fuser-heater is shut off (1045) when $t_{WI}=t_{TRIG}$. In some embodiments the trigger time may be set in the software and not accessible as a variable to a user.

If, when a print request is received, the fuser-heater is in a warm-up mode (1035), data from a print request is accepted at a slower rate than the maximum data transfer rate available. Data is accepted at the maximum rate after the fuser-heater is at operating temperature. If when a print request is received the fuser-heater is off, the control system turns it on (1031), putting the fuser-heater in warm-up mode, and the printer buffer accepts data more slowly until the fuser-heater is at operating temperature. The amount of time it takes for the fuser-heater to warm up is dependent upon the particular printer, and can vary. Additional contributing factors to the length of warm-up time include the difference between a printer being powered on after an intentional downtime, in which the length of time it takes to warm up is naturally greater, and the case when a print request has been handled only moments before, requiring only a short warm-up.

In an alternative, and somewhat more sophisticated embodiment of the invention, there is more than one trigger time, and the fuser-heater is only partially shut down in some instances. For example, the control routines may be written and hardware included in a printer, so the fuser-heater, after a first period of 5 minutes, would be reduced to ⅔ power. If no print request is received after 30 minutes, the power would be reduced to ⅓, and if no request is received after 1 hour, the power would be shut off.

This embodiment addresses the possible reasons for no print requests. The 5 minute trigger addresses the ongoing situation that assumes that the users have only periodic need for the printer, and allows for rapid warm up when a new request is received. The 30 minute trigger anticipates situations like lunch time and shift change, and still allows for a shorter warm up than a complete shut down. The one hour trigger anticipates everyone has gone home for the day or the weekend, and shuts off the power completely.

In this embodiment, the times may be adjusted empirically to provide the minimum power usage for the demand pattern of a particular organization, and in other embodiments more or fewer trigger times might be useful.

It will be apparent to one with skill in the art that there are a number of changes that may be made to the embodiments of the invention described herein without departing from the spirit and scope of the invention. One of these is the fact that the invention is not limited to any particular computer, network server, printer, display monitor, or other peripheral device. Computers or printer with fuser-heaters of any manufacture can be used providing control routines are written in the languages that the computers and printers require. The present invention can also be used to control several printers that are connected together into a network, and still allow manual operation of any one of the printers. The invention is broadly applicable to any system using printers that have fuser-heaters. as well as to display monitors, mass storage devices, and other peripheral devices.. It is seen, then, that there are many alterations that may be made without departing from the spirit and scope of the invention.

What is claimed is:

1. In a computer system having a host computer with a central processing unit (CPU), a memory, and input apparatus, and having also a connected peripheral device, a power management system for managing power usage by the peripheral device, comprising:

a user input dedicated to triggering a power-management routine;

a signal generator for generating at least one power-management command for the peripheral device; and a power manager circuit in the peripheral device;

wherein activation of the dedicated user input causes the signal generator to send a power management command to the peripheral device, and the power manager circuit in the peripheral device causes the peripheral device to assume a reduced-power state other than off in response to the power management command.

2. A Power management system as in claim 1 wherein the peripheral device is a video display provided with VGA-standard signals, and wherein the power management command is coded in the VGA-standard signals sent to the video display.

3. A Power management system as in claim 1 wherein the input apparatus includes a keyboard and the user input dedicated to triggering a power-management routine is a key combination to he entered at the keyboard.

4. A power management system as in claim 1 further comprising a timer adapted to measure periods of inactivity of the computer system, wherein activation of the dedicated user input signals the signal generator to send a first power management command to the peripheral device, to initiate the timer, and to send a second power management command to the peripheral device at a preset time as measured by the timer after the first power management command, and the power manager circuit in the peripheral device causes the peripheral device to assume a first reduced-power state in response to the first power management command and a second reduced power state in response to the second power management command.

5. A power management system as in claim 4 wherein the peripheral device is a video monitor receiving VGA-standard signals, and the first and second power management commands are coded in the VGA-standard signals.

6. A computer comprising:

a central processing unit (CPU);

a memory connected to the CPU for storing data and instruction routines;

input apparatus coupled to the CPU for a user to provide input to the computer;

a user input dedicated to triggering a power-management routine; and a signal generator adapted for sending at least one power management command to a port adapted for communication with a peripheral device;

wherein activation of the dedicated user input causes the signal generator to send a power management command to the port adapted to communicate with the peripheral device.

7. A computer as in claim 6 wherein the port is a video display port adapted to send VGA-standard signals, and wherein the power management command is coded in the VGA-standard signals to be sent to the video display.

8. A computer as in claim 6 wherein the input apparatus includes a keyboard and the user input dedicated to triggering a power-management routine is a key combination to he entered at the keyboard.

9. A computer as in claim 6 further comprising a timer adapted to measure periods of inactivity at the computer, wherein activation of the dedicated user input signals the signal generator to send a first power management command to the peripheral device port, to initiate the timer, and to send a second power management command to the peripheral device port at a preset time as measured by the timer after the first power management command.

10. A computer as in claim 9 wherein the peripheral device port is a port adapted to send VGA-standard signals to a video monitor, and wherein the first and second power management commands are coded in the VGA-standard signals.

11. A method for saving power in operation of a peripheral device of a computer system wherein a host computer sends signals to communicate with the peripheral device, comprising steps of:

(a) sensing operation of an input dedicated to initiate power management;

(b) sending a power-management command to the peripheral device in response to operation of the dedicated input;

(c) detecting the power-management command at the peripheral device;

(d) signaling power-management circuitry in the peripheral device from the detection circuitry that a power-management command is received; and (e) reducing power to power-using circuitry in the peripheral device to a level other than off by the power-management circuitry in response to the signal from the detection circuitry.

12. The method of claim 11 wherein, in step (b), a timer is started and a first power management command is sent as a result of sensing operation of the dedicated input, and a second power management command is sent after a predetermined time period measured by the timer.

13. The method of claim 12 wherein alternative reduced-power states are provided according to the first and second power management signals.

14. In a computer having circuitry providing signals to a peripheral device, a method for commanding the peripheral device to assume alternative power-using states, comprising steps of:

(a) sensing operation of an input dedicated to initiating power management;

(b) starting a timer and sending a first power management command coded in the signals to the peripheral device as a result of sensing the operation of the dedicated input; and (c) sending a second power management command coded in the signals to the peripheral device after a predetermined time period as measured by the timer.

* * * * *